Patented Oct. 30, 1934

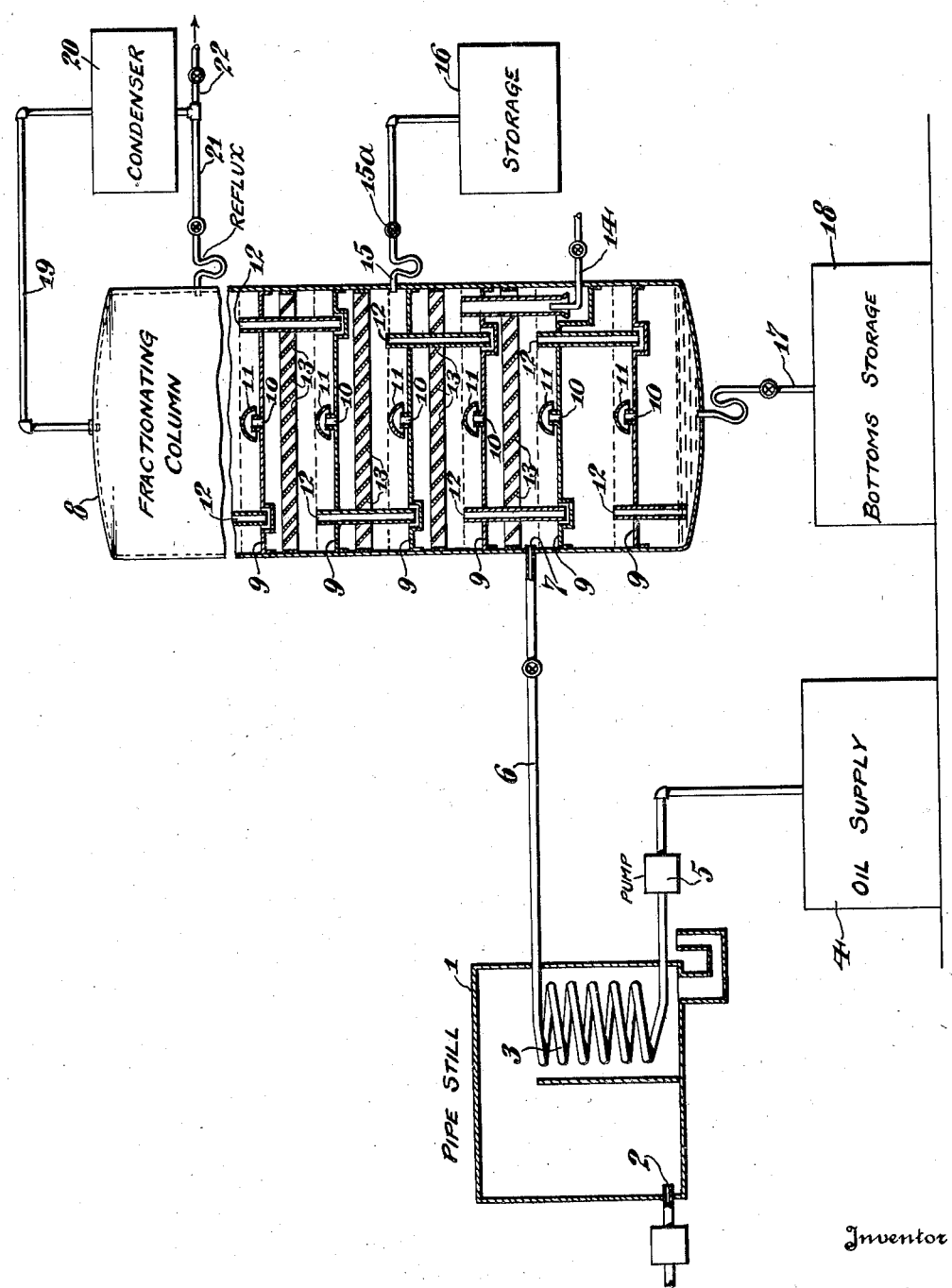

1,978,414

UNITED STATES PATENT OFFICE 1,978,414

FRACTIONAL DISTILLATION

Richard B. Chillas, Jr., Philadelphia, Pa., assignor to The Atlantic Refining Company, Philadelphia, Pa., a corporation of Pennsylvania Application November 21, 1930, Serial No. 497,197

2 Claims. (Cl. 196—139)

The present invention relates to the art of separating a composite liquid into components or groups of components, and more particularly to an improved process and apparatus for separating liquids, such as hydrocarbon oils, into two or more fractions. My invention will be explained in connection with the distillation of crude petroleum, it being understood that the principles disclosed may be applied to the separation of other composite liquids.

Separation of crude petroleum into fractions, as is well known, may be effected by first heating it to a temperature at which substantially all of the more volatile constituents thereof are in the vapor phase, then introducing the heated oil into the lower portion of a fractionating column, whereupon the vapors pass upwardly therethrough and come into intimate contact with descending reflux liquid which, for example, may collect as a series of pools in the column, each at a higher temperature than the one next above. Portions of the vapors are condensed in each of the pools, causing portions of the liquid in each of the pools to vaporize. Thus, each of the pools, starting with the lowermost, contains a liquid fraction condensed from the vapors, each fraction having a boiling range higher than that of the fraction in the pool next above, and from each such pool there may be withdrawn a different liquid fraction. The required heating may be effected in a pipe still or equivalent heating means, prior to introduction of the oil into the fractionating column. As the oil is pumped through the pipe still its temperature is progressively raised, whereupon the desired degree of vaporization is caused. At the inlet to the fractionating column the temperature of the oil may be of the order of 800° F., when a crude is being distilled. At temperatures of this order substantially all of the constituents of the crude, except perhaps that portion thereof which is to collect as "bottoms" in the column below the inlet, is in the vapor phase.

Vaporization such as hereinabove referred to, causes a considerable increase in volume and an incident considerable increase in velocity during passage of the oil through the pipe still. Due to the high velocity attained by the oil in passing through the pipe still, especially during passage through the last stages thereof where the velocity may be of the order of 10,000 ft./min., small portions of the unvaporized part of the oil or the tar-like materials referred to as "bottoms", become entrained in the vaporized part of the oil in the form of finely divided mist, referred to in the art, and hereinafter, as "tar-fog". Upon introduction of the heated oil into the fractionating column this tar-fog persists and is carried upwardly by the vapors, resulting in contamination of at least some of the pools of liquid in the column, particularly the lower pools. The remainder of the unvaporized portion or bottoms drops to that portion of the column below the point at which the oil is introduced thereinto.

Although the amount of this tar-fog entrained in the vaporized oil may be only a very small portion of the total oil introduced into the column, even in small amounts it is sufficient materially to increase the color of certain of the condensed fractions, particularly the higher boiling fractions of the oil which constitute the lower pools in the column, and this color increase is very undesirable.

A primary object of the present invention is to overcome the difficulties encountered in the operation of a system as above set forth or its equivalent. Although such a system may be one of several types, the modes of operation of which may vary considerably, there are certain common characteristics in structure and operation of apparatus of this class which render my invention one of broad application. One skilled in the art will recognize various applications of my invention from the following description of a specific modification thereof.

For a better understanding, my invention will be described specifically with reference to the fractional distillation of crude petroleum by heating the same in a pipe still and introducing the heated oil into a fractionating column of the bubble plate type; but it is emphasized that I do not contemplate limiting my invention to any specific application.

I have found that the tar-fog entrained in vapors entering a column of the type just mentioned may be effectively removed by circulating liquid bottoms which collect below the vapor inlet through one or more bubble plates just above the vapor inlet, whereby the incoming vapors in passing through the liquid so circulated, which is at a temperature substantially equal to the temperature of said vapors, deposit the tar-fog in the liquid but do not themselves condense. In such a system a side stream fraction may be removed from a zone just above that or those through which liquid from below the vapor inlet is circulated, and such side stream fraction will be substantially free from color-imparting tar-fog.

The single figure in the accompanying drawing is a diagrammatic representation of apparatus, exemplary of that in which my process may be carried out.

In the drawing, 1 represents a conventional pipe still having burner 2 and heating coil 3. Oil from supply tank 4 is transferred by pump 5 through heating coil 3 of the pipe still where the oil is heated to a temperature sufficient to vaporize the desired portion thereof. The mixture of vapors and liquid passes from the pipe still through line 6 into inlet 7 of the bubble column 8. As shown, this column has bubble plates 9 which have vapor uptakes 10, bubble caps 11, and downflow pipes 12. Below each bubble plate is arranged a series of baffle plates 13. A steam lift 14 is arranged between the plates adjacent the inlet 7, and is adapted to transfer liquid from the plate just below the inlet to the plate just above it. Liquid supplied by the steam lift flows across the plate above the vapor inlet, contacting thereon the uprising vapors, thereby removing entrained tar-fog, and passes through the downflow pipe to the plate from which it was transferred by the steam lift. Other means, such as a mechanical pump, may be substituted for the steam lift. Line 15 having a valve 15a taps the second plate above the vapor inlet at a point below the top of the downflow pipe of said plate, and leads to tank 16. Valve controlled line 17 leads from the bottom of the column to tank 18 and serves as means for withdrawing "bottoms" from the column. Vapors leaving the top of the column through line 19 are liquefied in condenser 20, and a portion of the liquid is returned to the column through valve controlled line 21 to serve as reflux, while the remainder is passed through valve controlled line 22 to suitable storage (not shown) or is otherwise suitably disposed of.

Upon entering the column through inlet 7 the major portion of the liquid accompanying the vapors passes to the plate just below said inlet; however, a small portion of the liquid remains entrained in the vapors in the form of tar-fog and is not removed therefrom even when the vapors contact the baffles just below the first bubble plate through which they pass. Steam lift 14 keeps the plate just above the inlet supplied with liquid which initially passes to the plate just below the inlet. As the temperature of this liquid is substantially the same as that of the incoming charge, very little, if any, condensation occurs on such plate. I have found that by so operating, the upwardly traveling vapors, as for example those which occur in the zone defined by the second and third plates above the vapor inlet, contain no appreciable entrained tar-fog. Upon reaching the second plate above the inlet, the vapors come into contact with downwardly flowing reflux liquid, and condensation of vapors begins, whereupon the column, during passage of the vapors through the remainder thereof, operates in the conventional manner.

Although the second plate above the inlet is equipped with a downflow pipe, this is a precautionary measure, as ordinarily the liquid which collects thereupon is continuously withdrawn through the line 15, so that the liquid level on the plate is below the top of the downflow pipe. The flow of reflux liquid onto the plate immediately above the vapor inlet, if permitted, would lower the temperature of the liquid thereupon, causing condensation of vapors and consequent loss of volatile constituents to such liquid which is of the nature of bottoms, thereby decreasing the efficiency of the column. This, however, is overcome by operation control, as for example in the manner aforesaid.

As stated hereinbefore the formation of tar-fog occurs during passage of the oil through the pipe still, and particularly in the high velocity region thereof. As a fractionating column is of considerably greater cross sectional area than the inlet line thereof, the velocity of vapors through the column is materially less than the vapor velocity in the pipe still, which, as before stated may be of the order of 10,000 feet per minute. At the high velocity of the pipe still the vapors tend to pick up tar-fog in sufficiently permanent entrainment to withstand the reduction in velocity within the fractionating column. However, at this reduced velocity it is possible to remove tar-fog from the vapors by intimately contacting the vapor with a pool of tar. It is my theory that this intimate contact causes the minute tar-fog particles to coalesce with the tar with which the vapors are contacted. Therefore, in accordance with my invention the vapors containing tar-fog are reduced in velocity to the extent necessary to permit coalescence of the tar-fog with a liquid of similar character, that is, a liquid which will be completely miscible with the tar-fog. The velocity which will allow removal of tar-fog in any case will depend upon such factors as temperature, inlet velocity of the vapors, and the particular charge to the pipe still. In the ordinary bubble tower the velocity of vapors in passing through the liquid on the first plate above the vapor inlet may be of the order of one-tenth of that of vapor entering the tower.

It is characteristic of a fractionating column of the bubble plate type that in passing through the liquid on any plate thereof the vapors entrain substantial amounts of said liquid. This kind of entrainment is to be distinguished from that entrainment of liquid in the vapors as initially introduced into the column. Entrainment of the kind first mentioned may be effectively overcome by using baffle plates, such as the plates 13 shown in the drawing, but entrainment of the kind last mentioned, or tar-fog entrainment is of a more persistent nature. The liquid entrainment resulting from passing the vapor through the liquid on the bubble plates is substantially completely removed by having the vapor come into contact with means such as the baffle plates 13 mounted just below each of such plates. But, as before stated, for the deentrainment of "tar-fog" from vapors, I have found that considerable advantage is gained by operating in accordance with my invention hereinabove explained.

Regardless of the composite liquid being separated into fractions, if complete vaporization thereof is not effected in the pipe still or equivalent heating means, a persistent "fog" of those constituents which were not vaporized is entrained in the vapors. Thus even when re-running a distillate as for example, a pressure distillate, composed of several fractions which it is desired to separate from each other, a material fog will occur in the vapors unless high enough temperatures are employed to effect complete vaporization. In the appended claims the term "tar-fog" will be used to denote broadly the entrained liquids which are present in vapors as the result of incomplete vaporization in a pipe still, or equivalent operation.

It is to be understood that it may be of advantage to circulate liquid from one or more of the plates or zones below the inlet to the fractionating column, to one or more of the plates or zones above such inlet, for the purpose of removing tar-fog from vapors; and since the principles involved and the reasons for so operating are the same as hereinabove given, such modification is considered within the scope of my invention.

What I claim is:

1. A process for fractionating crude petroleum oil, which comprises heating said oil in a pipe still to vaporize the desired portion thereof, introducing the resultant mixture of liquid and vapor into a fractionating tower, said vapor containing a portion of the unvaporized constituents of the oil entrained as tar-fog, transferring unvaporized constituents of the oil from below the point of introduction of said mixture into the fractionating tower to a zone immediately above said point of introduction, passing said vapors through said zone, thereafter passing said vapors through a plurality of fractionating zones, passing reflux liquid through said fractionating zones countercurrent to and in contact with said vapors, and withdrawing liquid from the first of said fractionating zones.

2. In the art of fractional distillation of a composite liquid, the process which comprises passing the liquid in a restricted stream and at a high velocity through a heating zone, thereby to vaporize a substantial portion thereof, passing the resulting vapor-liquid mixture into a zone, reducing its velocity and separating vapors from the bulk of the liquid while in said zone, forming a pool within the zone of the liquid so separated, maintaining the liquid at substantially the temperature of the vapor-liquid mixture introduced into the zone, circulating liquid from the pool in said zone through a second zone and back to said pool, bubbling the separated vapors at reduced velocity through the liquid circulating through said second zone, thereby to remove from the vapors liquid entrained therein of the character of that through which the vapors are bubbled without to substantial extent causing condensation of vapors, thereafter passing the vapors through fractionating zones, thereby to separate the vapors into fractions, and withdrawing one of said fractions as a side stream from one of the fractionating zones.

RICHARD B. CHILLAS, Jr.